(12) United States Patent
Baur et al.

(10) Patent No.: US 6,371,508 B1
(45) Date of Patent: Apr. 16, 2002

(54) GAS BAG MODULE

(75) Inventors: Andreas Baur, Elchingen; Benedikt Heudorfer, Nersingen, both of (DE)

(73) Assignee: Takata (Europe) Vehicle Safety Technology GmbH (DE)

( * ) Notice: Subject to any disclaimer, the term of this patent is extended or adjusted under 35 U.S.C. 154(b) by 0 days.

(21) Appl. No.: 09/377,716

(22) Filed: Aug. 20, 1999

(30) Foreign Application Priority Data

Aug. 20, 1998 (DE) .......................................... 198 37 899

(51) Int. Cl.[7] .............................................. B60R 21/16
(52) U.S. Cl. ..................................... 280/728.2; 280/731
(58) Field of Search .......................... 280/728.2, 728.1, 280/730.1, 731

(56) References Cited

U.S. PATENT DOCUMENTS

| 5,284,359 A | * | 2/1994 | Baba ........................... 280/731 |
| 5,312,129 A | * | 5/1994 | Ogawa ........................ 280/731 |
| 5,482,313 A | * | 1/1996 | Ikeya et al. .............. 280/728.2 |
| 5,580,082 A | | 12/1996 | Shiga |
| 5,615,907 A | * | 4/1997 | Stanger .................... 280/728.2 |
| 5,692,773 A | | 12/1997 | Ono ........................ 280/728.2 |
| 5,775,724 A | * | 7/1998 | Tonooka et al. ......... 280/728.2 |
| 5,782,481 A | | 7/1998 | Magoteaux |
| 5,794,968 A | * | 8/1998 | Yamamoto et al. ...... 280/728.2 |
| 5,803,490 A | * | 9/1998 | Seventko et al. ........ 280/728.2 |

FOREIGN PATENT DOCUMENTS

| DE | 195 22 313 | 1/1996 |
| DE | 197 31 973 A1 | 1/1998 |
| DE | 197 31 314 | 1/1999 |
| WO | WO 98/14352 | 4/1998 |

* cited by examiner

*Primary Examiner*—Kenneth R. Rice
*Assistant Examiner*—Lynda Jasmin
(74) *Attorney, Agent, or Firm*—Foley & Lardner

(57) ABSTRACT

The invention relates to an airbag module for motor vehicles comprising a housing for a folded together inflatable air bag and a holder element which can be locked to the housing, with the holder element extending in the locked state with at least one holder section through the side wall of the housing in the region of a lug of the side wall which can be bent aside relative to the side wall.

19 Claims, 2 Drawing Sheets

GAS BAG MODULE

Figure 1:
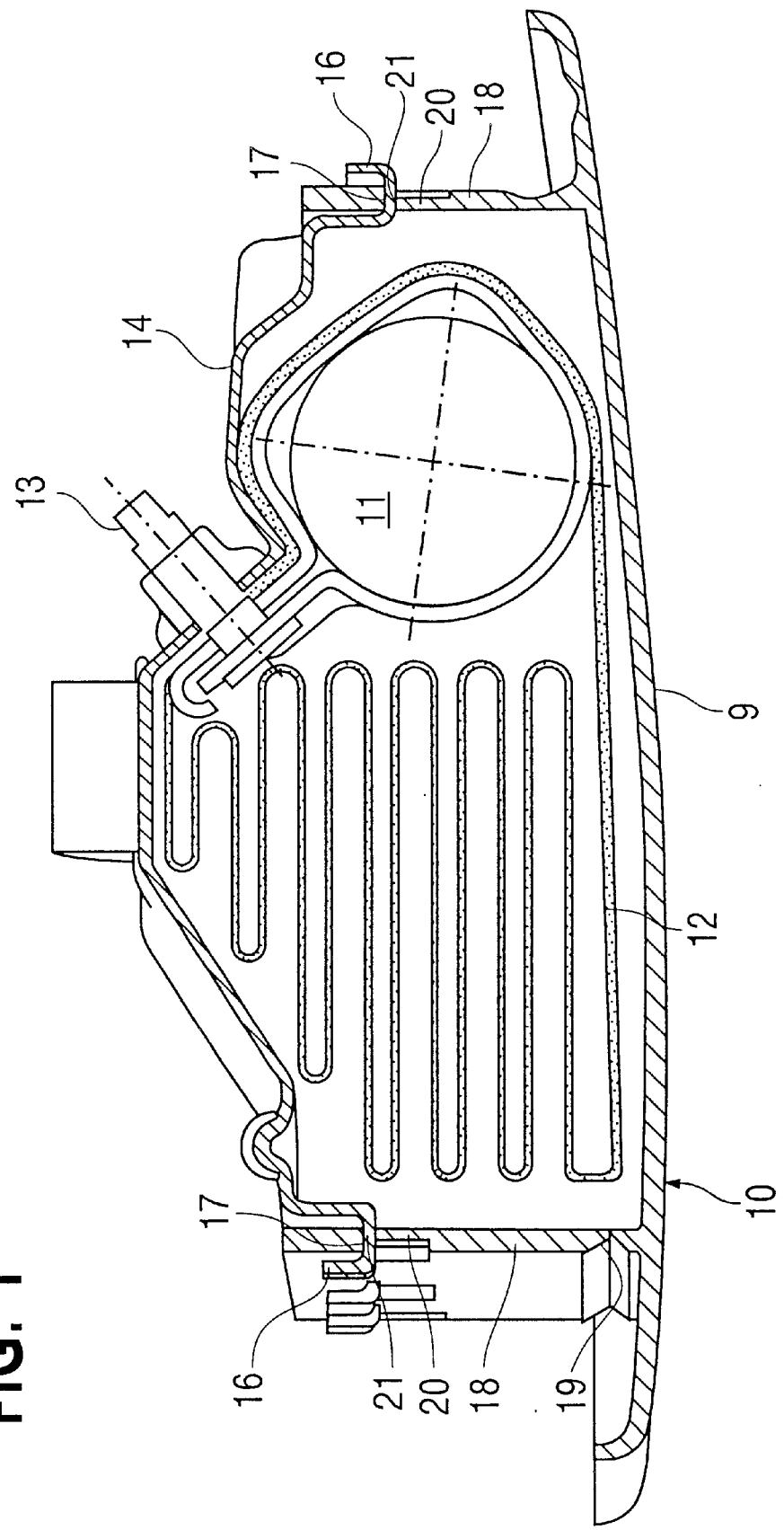

The invention relates to a gas bag module for motor vehicles comprising a housing for a folded together inflatable gas bag and a holder element which can be locked at the housing.

Modules of this kind are known in principle and serve to mount a folded together inflatable gas bag together with a gas generator which inflates the gas bag in the event of a collision as a unit in the vehicle, e.g. as a driver's, a driver's mate's or a side airbag.

The problem (object) lying at the basis of the invention is to provide a gas bag module for motor vehicles which is as simply constructed and easy to assemble as possible.

This object is satisfied by the features of claim 1 and in particular in that the holder element extends in the locked state with at least one holder section through the side wall of the housing in the region of a lug of the side wall which can be bent aside relative to the side wall.

The lug, which can be bent aside relative to the side wall, permits the passing through of the holder section through the side wall so that the invention enables the holder element to be locked to the housing in that the holder section is brought into engagement with the side wall of the housing without it being necessary that a sufficiently large opening for this is formed in the side wall. In this the lug prevents the holder section from arriving out of engagement with the housing by itself. In addition separate connection means such as screws, clamps etc. can be dispensed with.

In accordance with a preferred embodiment of the invention the lug is designed as a constituent of the side wall, with the outline of the lug being determined by a preferably slit-like cut-out and/or by an incision in the side wall.

Through this the side wall of the housing can be designed in a particularly simple manner for the locking with the holder element.

In accordance with a further preferred exemplary embodiment of the invention the holder section of the holder element is clamped in the locked state between the lug, which extends approximately parallel to the side wall, and the edge of the side wall facing the lug.

In this way the holder section and thus the holder element is secured in the locked state by the lug in such a manner that the holder section can not arrive out of engagement with the side wall by itself.

In accordance with a further preferred exemplary embodiment of the invention the lug, at least region-wise, has a lower material strength or thickness than at least regions of the side wall surrounding the lug.

The force required to move the lug relative to the side wall of the housing is reduced in this way.

In accordance with a further preferred embodiment of the invention the lug can be bent aside relative to the side wall against a restoring force from a position extending approximately parallel to the side wall.

Through this the lug can move resiliently back to its initial position, in which the lug extends approximately parallel to the side wall, after the holder section has been passed through the side wall, through which the lug automatically arrives into a position which secures the holder section.

Further embodiments of the invention are set forth in the subordinate claims, in the description and in the drawings.

Figure 3A:
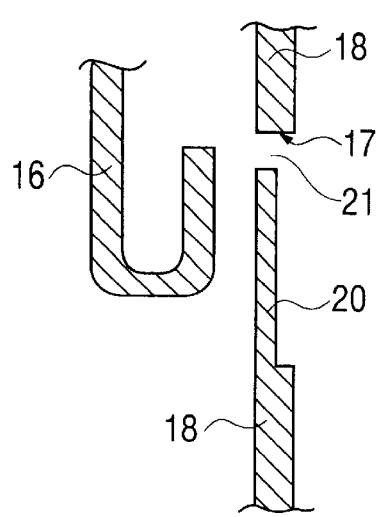
Figure 3B:
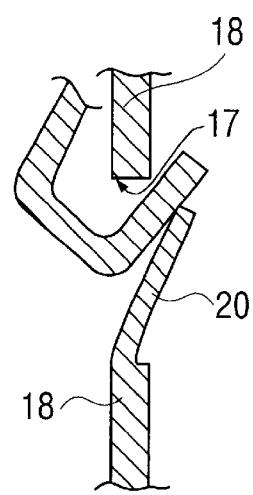
Figure 3C:
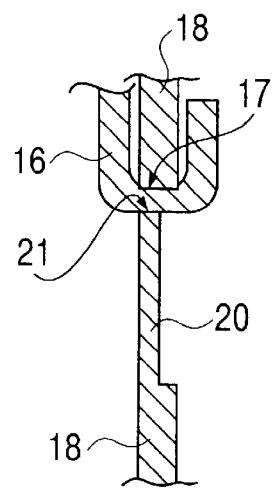
Figure 2A:
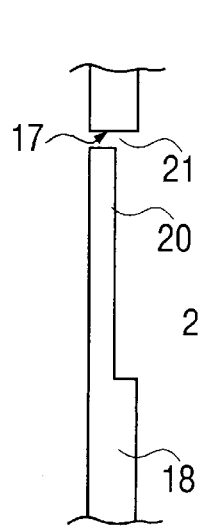
Figure 2B:
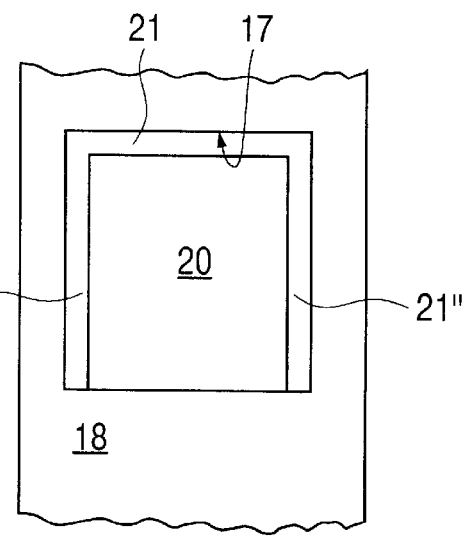

The invention will be explained in the following in an exemplary manner with reference to the drawings. Shown are:

FIG. 1 a partially sectioned side view of an embodiment of a gas bag module in accordance with the invention, FIGS. 2a and 2b the side wall of the housing of a gas bag module in accordance with the invention in the region of a lug in a side view and a plan view respectively, and FIGS. 3a to 3c cross-sectional views of a holder section and of a side wall of a housing of a gas bag module in accordance with the invention in three different stages of the locking process.

The gas bag module in accordance with the invention in accordance with FIG. 1, which is preferably used as a front-side-airbag module, comprises a cap-shaped housing 10 of plastic, which consists of a cover plate 9 and a side wall 18 which is formed thereat, and a holder element 14 which is designed as a sheet metal base which closes off the open side of the housing 10 and which is in engagement via holder sections 16 which are provided at its periphery with the side wall 18 of the housing 10 in the manner in accordance with the invention which is described further below.

A folded together gas bag 12 and a gas generator 11, with which the gas bag 12 is inflated in the event of a collision, are arranged in the housing 10. The gas generator 11 is fastened to the holder element 14 with a plurality of bolts 13 which are passed through the holder element 14, and of which only one bolt 13 is illustrated in FIG. 1.

On a side of the gas bag 12 which faces away from the gas generator 11 the side wall 18 of the housing 10 has a desired breaking location 19 of reduced material strength or thickness at which the side wall 18 is torn open by the inflating gas bag 12 in the event of a collision.

The holder sections 16 of the holder element 14 are designed as individual lugs which protrude outwardly and are distributedly arranged over the entire periphery of the holder element 14, wherein they are in each case angled aside twice in the manner of a hook outwardly and upwardly by approximately 90° in each case in such a manner that they have an approximately U-shaped cross-section.

In the state locked with the side wall 18 of the housing 10 in accordance with FIGS. 1 and 3c the holder sections 16 of the holder element 14 extend through openings 21 which are provided in the side wall 18 of the housing 10 and grip about the edge 17 of the side wall 18 which is present above the openings 21.

From FIGS. 2a and 2b it can be recognised that lugs 20 which have a lesser material thickness by about half than the regions of the side wall 18 surrounding the lugs 20, are formed in the side wall 18 by cut-outs 21, 21', 21" which are provided on three sides of a rectangular region. The lugs 20 are elastically deformable and can be bent aside relative to the side wall 18 from their position in accordance with FIGS. 2a and 2b against a restoring force which attempts to restore the lugs 20 back into the position in accordance with FIG. 2a.

Instead of the cut-outs 21, 21', 21", which together form an approximately U-shaped slit in the side wall 18, an incision can also be provided in the side wall 18, with there not in such a case being any intermediate spaces present between the lugs 20 and the region of the side wall 18 surrounding the lugs 20 in each case.

FIGS. 3a to 3c show, in the example of a holder section 16, in which manner the holder element 14 is locked to the side wall 18 of the housing 10.

The holder section 16 is first located in accordance with FIG. 3a on the inner side of the side wall 18, i.e. inside the housing 10.

FIG. 3b shows how the holder section 16 is pressed against the lug 20, which extends parallel to the side wall 18, in order to lead the upwardly bent aside part of the holder section 16 to the outside under the edge 17 of the side wall 18 which faces the lug 20. The lug 20 is thereby bent aside towards the outside, and indeed as a result of its elastic deformability, against a restoring force.

When the upwardly bent aside part of the holder section 16 is oriented parallel to the side wall 18 outside the housing, the lug 20 can move resiliently back to its initial position in accordance with FIG. 3c so that the part of the holder section 16 which extends perpendicular to the side wall 18 is located between the lug 20 and the edge 17 of the side wall 18.

The width of the cut-out 21 corresponds to the wall thickness of the part of the holder section 16 which extends through the cut-out 21 so that the holder section 16—and thus the holder element 14—is secured by the lug 20 in such a manner that the holder section 16 can not be moved freely away from the edge 17 of the side wall 18.

The holder element 14, which is provided with a plurality of holder sections which are distributedly arranged over its periphery, is locked at the housing 10 in such a manner that it is first hung in with a longitudinal side into the side wall 18 of the housing 10 in that the holder sections 16 which are provided at this longitudinal side are in each case brought into engagement with the side wall 18 in the region of a lug 20 which is associated with it. Afterwards the holder element 14 which has been hung in on one side in this way is pivoted into its final position in accordance with FIG. 1 in order to bring the remaining holder sections 16 into engagement with the side wall 18. Through a slight widening of the housing 10 and/or bending of the holder element 14, the holder element 14 can in this be pressed into the housing 10, with the holder sections 16 in each case moving inside along the side wall 18 up to the lug 20 associated with them in order finally to be able to be led in each case outwardly through the side wall 18 through the bending aside of the lug 20.

LIST OF REFERENCE NUMERALS 9 cover plate
10 housing
11 gas generator
12 gas bag
13 bolt
14 holder element
16 holder section
17 edge of the side wall
18 side wall
19 desired breaking location
20 lug
21, 21', 21"cut-outs

What is claimed is:
1. Gas bag module for motor vehicles comprising
a housing for a folded together inflatable gas bag;
a holder element locked to the housing; and
a bendable lug located in a side wall of the housing;
wherein the holder element includes at least one holder section extending through the side wall of the housing in the region of the lug;
wherein the holder section of the holder element is clamped in the locked state between the lug, which extends approximately parallel to the side wall, and the edge of the side wall which faces the lug.
2. Gas bag module in accordance with claim 1, wherein the lug is designed as a constituent of the side wall and the outline of the lug is determined by a slit-like cut-out in the side wall.
3. Gas bag module in accordance with claim 1, wherein the side wall of the housing has a plurality of lugs which are in each case associated with one of the at least one holder section of the holder element and are distributed over the periphery of the side wall.
4. Gas bag module for motor vehicles comprising:
a housing for a folded together inflatable gas bag;
a holder element locked to the housing; and
a bendable lug located in a side wall of the housing;
wherein the holder element includes at least one holder section extending through the side wall of the housing in the region of the lug;
wherein the lug includes a region having a lower material strength than at least regions of the side wall which surround the lug.
5. Gas bag module in accordance with claim 4, wherein the lug has an approximately rectangular cross-section.
6. Gas bag module in accordance with claim 4, wherein the housing is configured as a cover cap which comprises plastic and the holder section comprises sheet metal.
7. Gas bag module in accordance with claim 4, wherein the bendable lug is bendable relative to the side wall.
8. Gas bag module in accordance with claim 4, wherein the side wall of the housing has a plurality of lugs which are in each case associated with one of the at least one holder section of the holder element and are distributed over the periphery of the side wall.
9. Gas bag module in accordance with claim 4, wherein the holder element is secured to the side wall by the lug so that the element does not move freely in a direction parallel to the side wall.
10. Gas bag module for motor vehicles comprising:
a housing for a folded together inflatable gas bag;
a holder element locked to the housing; and
a bendable lug located in a side wall of the housing;
wherein the holder element includes at least one holder section extending through the side wall of the housing in the region of the lug;
wherein the lug is provided in a region of a free end of the side wall which faces the holder element in the locked state.
11. Gas bag module in accordance with claim 10, wherein the lug is designed as a constituent of the side wall and the outline of the lug is determined by a slit-like cut-out in the side wall.
12. Gas bag module in accordance with claim 10, wherein the housing is configured as a cover cap which comprises plastic and the holder section comprises sheet metal.
13. Gas bag module for motor vehicles comprising:
a housing for a folded together inflatable gas bag;
a holder element locked to the housing; and
a bendable lug located in a side wall of the housing;
wherein the holder element includes at least one holder section extending through the side wall of the housing in the region of the lug;
wherein the lug can be bent aside relative to the side wall against a restoring force from a position extending approximately parallel to the side wall.
14. Gas bag module for motor vehicles comprising:
a housing for a folded together inflatable gas bag;
a holder element locked to the housing; and
a bendable lug located in a side wall of the housing;
wherein the holder element includes at least one holder section extending through the side wall of the housing in the region of the lug;

wherein the holder section of the holder element extends in the locked state through the side wall of the housing from the inside to the outside of the housing.

15. Gas bag module in accordance with claim 14, wherein the holder section is formed in a single piece with the holder element.

16. Gas bag module for motor vehicles comprising:

a housing for a folded together inflatable gas bag;

a holder element locked to the housing; and a bendable lug located in a side wall of the housing;

wherein the holder element includes at least one holder section extending through the side wall of the housing in the region of the lug;

wherein in the locked state the holder section grips about an edge of the side wall which faces the lug and is bent generally in the shape of a U.

17. Gas bag module in accordance with claim 16, wherein the holder element is secured to the side wall by the lug so that the element does not move freely in a direction parallel to the side wall.

18. Gas bag module in accordance with claim 16, wherein the holder section is formed in a single piece with the holder element.

19. Gas bag module in accordance with claim 16, wherein the bendable lug is bendable relative to the side wall.

\* \* \* \* \*